United States Patent [19]

Janiak et al.

[11] Patent Number: 4,805,186
[45] Date of Patent: Feb. 14, 1989

[54] PROCESS FOR THE CONTINUOUS MELTING OF SCRAP IN AN ELECTRIC DIRECT-CURRENT FURNACE AND ELECTRIC FURNACE FOR CARRYING OUT THE PROCESS

[75] Inventors: Robert A. Janiak, Saint-Genest-Malifaux; Jean G. Davené, Marly Le Roi, both of France

[73] Assignee: Clecim, Courbevoi, France

[21] Appl. No.: 79,330

[22] Filed: Jul. 30, 1987

[30] Foreign Application Priority Data

Aug. 1, 1986 [FR] France .................................. 86 11217

[51] Int. Cl.⁴ ............................................. H05B 7/00
[52] U.S. Cl. .......................................... 373/79; 373/71; 373/108
[58] Field of Search .................... 373/79, 81, 108, 107, 373/71, 72, 60

[56] References Cited

U.S. PATENT DOCUMENTS 2,541,764  2/1951  Herres et al. .................. 373/81 X
3,665,085  5/1972  Dumont-Fillon et al. ........... 373/81
4,038,483  7/1977  Stenkvist ........................ 373/108

Primary Examiner—Roy N. Envall, Jr.
Attorney, Agent, or Firm—Pollock, Vande Sande & Priddy

[57] ABSTRACT

Process and apparatus for the continuous melting of scrap in an electric D.C. furnace, in which the D.C. source (23) supplies vault electrodes (4) and hearth electrodes (8) by means of respective feed conductors (7) and return conductors (9). The scrap is fed through an orifice (12). The vault electrode or electrodes (4) are arranged on the other side of the axis of the shaft (1) in relation to the orifice (12). The hearth electrode or electrodes (8) are offset towards the orifice (12), and the return conductor or conductors (9) connected to the hearth electrode or electrodes (8) are led under the bottom (2) of the shaft (1) and as near as possible to the latter, being directed towards the opposite zone of the furnace where the vault electrodes (4) are located, as to generate magnetic fields capable of deflecting the arc or arcs towards a zone set apart from the vault electrodes (4) and located substantially below the scrap feed orifice (12).

14 Claims, 1 Drawing Sheet

PROCESS FOR THE CONTINUOUS MELTING OF SCRAP IN AN ELECTRIC DIRECT-CURRENT FURNACE AND ELECTRIC FURNACE FOR CARRYING OUT THE PROCESS

FIELD OF THE INVENTION

The present invention relates to a process for the continuous melting of scrap in an electric direct-current furnace and an electric furnace for carrying out the process. The furnace comprises a shaft which is closed by means of a vault and in which a bath of liquid metal forms as a result of the melting of scrap fed continuously via an orifice made in the vault. Melting is obtained by means of at least one electric arc flashing between at least one electrode penetrating into the shaft through the vault and at least one electrode arranged in the shaft bottom which forms a hearth having a refractory lining, the said vault and hearth electrodes being connected respectively by means of current feed and return conductors to the two poles of a direct-current source.

BACKGROUND OF THE INVENTION

Continuous feeding of scrap into electric furnaces supplied with alternating current is known, as are furnaces supplied with direct current.

However, in furnaces supplied with alternating current, the asymmetry of the arcs, which can be corrected partially as a result of electrical unbalance, gives rise to an unbalance between the three high-voltage supply phases which is incompatible with the requirements of the electrical energy supplier. This disadvantage does not arise in furnaces supplied with direct current.

Moreover, in arc furnaces the electrodes are normally arranged in the center of the vault, and the aim is to keep the arcs exactly vertical in the axis of the shaft, in order as far as possible to prevent localized overheating of the walls attributable to deflections of the arcs. However, it is difficult to introduce the scrap into the hottest zone, i.e., in practice, at the melting center located in the middle of the electrodes.

Although it has been proposed to use hollow electrodes serving as feed tubes, this technique makes the production of the electrodes more complicated and, in any case, can only be used with a raw material in divided form, and not scrap.

SUMMARY OF THE INVENTION

The subject of the present invention is a process and an arc furnace supplied from a direct-current source and fed continuously with scrap, in which, by careful use of the magnetic field generated by the electrical conductors, it is possible to locate the hottest point forming the melting center of the scrap in the same place as that where the scrap can easily be introduced continuously.

This problem is solved because, with the scrap feed orifice, on the one hand, and the vault electrode or vault electrodes, on the other hand, being offset respectively on either side of the axis of the shaft, the hearth electrode or hearth electrodes are offset in the direction of the orifice, and the return conductor or return conductors connected to the hearth electrode or hearth electrodes are led under the bottom of the shaft and as near as possible to this, being directed towards the zone of the furnace opposite from where the vault electrodes are located, so as to generate magnetic fields capable of deflecting the arc or arcs towards a zone set apart from the vault electrodes and located substantially below the scrap feed orifice.

The invention also relates to the following characteristics considered separately or in all their technically possible combinations:

(1) The furnace has a plurality of vault and hearth electrodes arranged respectively in two series, each directed substantially in one plane, these planes being offset on either side of the axis, and the conductors connected respectively to the electrodes being arranged in two groups, the conductors of each group being parallel to one another and being directed transversely relative to the plane of the corresponding electrodes, the return conductors being directed so as to pass substantially vertically in line with the vault electrodes.

(2) The second group of conductors (9) is arranged substantially along the bottom of the metal shaft.

(3) The hearth electrodes are arranged in front of the vault electrodes, as seen in the direction of the scrap feed orifice.

(4) Both the second group of conductors and the hearth electrodes are respectively parallel to the first group of conductors and to the vault electrodes.

(5) Both the second group of conductors and the hearth electrodes are respectively offset laterally relative to the first group of conductors and the vault electrodes.

(6) The bottom of the metal shaft is of minimum thickness.

(7) The metal shaft has a low relative magnetic permeability of approximately 40 to approximately 500.

(8) The metal shaft is made of non-magnetic metallic material.

(9) The furnace has, on the scrap feed side, a reinforcement made of refractory material.

(10) The reinforcement made of refractory material consists of a material selected from the metallic oxides, cast iron and steel.

(11) The shaft is mounted tiltably about a horizontal axis substantially perpendicular to the vertical plane of symmetry, on which at least one group of vault electrodes is centered, a casting hole and a cleaning sill being located on either side of the said axis.

(12) The furnace also has an intake for alloying elements and an oxygen blowing intake located opposite the scrap intake.

(13) The furnace has an oxygen injection on the surface of the metal on the same side as the feed and return of the electrical current.

BRIEF DESCRIPTION OF THE DRAWINGS

The invention also embraces other advantageous characteristics which will emerge from the following detailed description of several embodiments, given by way of example with reference to the accompanying drawings, in which.

DESCRIPTION OF PREFERRED EMBODIMENT

Figure 1:
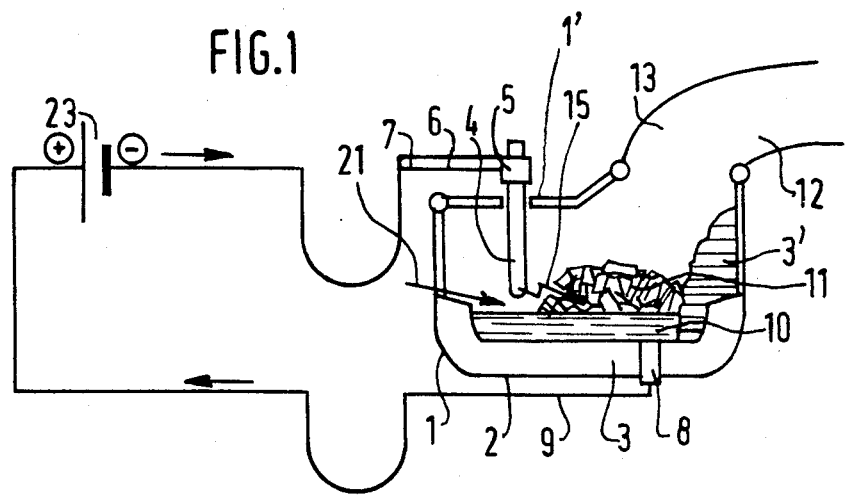
FIG. 1 is a diagrammatic section through a furnace according to the invention.
Figure 3:
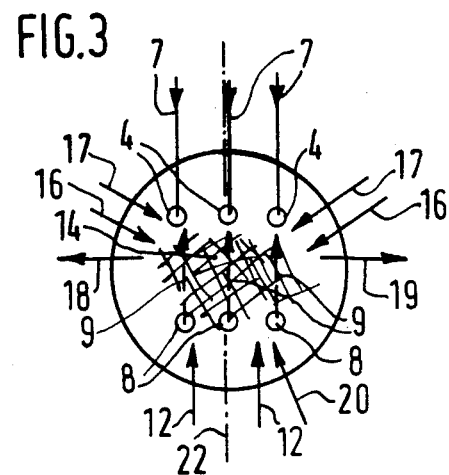

In the accompanying drawing, similar parts are designated by the same reference numerals. The furnace, which is supplied from a direct-current source 23, comprises a metal shaft 1 containing a liquid bath 10 receiving on top of it scrap 11 which is fed from an upper vault orifice 12 located opposite a plurality of vault electrodes 4 connected to a first group of conductors 7 supplying current coming from the direct-current source 23. In the lower part, the refractory hearth 3 is equipped with a plurality of electrodes 8 connected to a second group of conductors 9 which return to the direct-current source. The current circulates in the direction indicated by the arrows in FIG. 1. The vault electrodes 4 are at a distance from the scrap 11, so as not to be damaged by the said scrap, and are carried by tongs 5 supplied via the conductors 7 which go to the direct-current source. As already mentioned, the scrap feed orifice 12 and the smoke outlet 13 are substantially opposite the vault electrodes 4. In order to protect the shaft 1, the bottom of which is designated by 2, against the scrap on the same side as the feed 12 for scrap 11, according to the present invention a reinforcement 3' made of refractory material, for example consisting of metallic oxides, cast iron or steel, is provided, as illustrated in FIG. 1. Oxygen is injected at 21 onto the surface of the metal on the same side as the feed and return of the electrical current carried by the first group of conductors 7 and the second group of conductors 9. The reference numeral 6 denotes conductive arms connected to the tongs 5. In order to localize the melting zone 14, according to the present invention the second group of conductors 9 of the hearth electrodes 8 is arranged as near as possible to the bottom 2 of the metal shaft 1 and turned towards the vault electrodes 4 in the direction opposite to the zone of the furnace where the hearth electrodes 8 are inserted. Conventionally, the second group of conductors 9 is arranged substantially horizontally relative to the bottom 2 of the metal shaft 1. As shown in FIG. 3, the second group of conductors 9 is a network of substantially parallel conductors.

Because, during feeding via the orifice in the vault 12, the overheating of the metal is at its maximum on the side of the scrap 11 opposite the orifice 12, on this side of the shaft 1 there is an intake 16 for alloying elements and an oxygen blowing intake 17.

Figure 2:
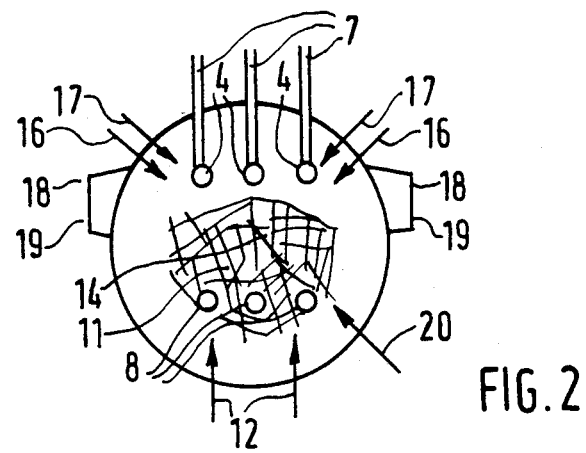
FIGS. 2 and 3 are diagrammatic plan views of a first embodiment of the invention.

The shaft 1 is mounted tiltably about a horizontal axis arranged in a vertical plane of symmetry, on which at least one group of vault electrodes 4 and the feed orifice 12 are centered, a cleaning sill 18 and the casting hole 19 being located on either side of this plane, in the same way as the alloying-element intake 16 and the oxygen blowing intake 17, as shown in FIGS. 2 and 3. There is also a lime intake 20 between the scrap feed orifice 12 and the cleaning zone 18 or liquid-metal outlet 19. The hearth electrodes 8 are arranged in front of the vault electrodes 4, as seen in the direction of the feed orifice 12 for the scrap 11.

In the embodiment according to FIG. 3, the vault electrodes 4 and hearth electrodes 8 are arranged in parallel planes, and the conductors 9 connected to the hearth electrodes 8 are parallel to the conductors 7 of the vault electrodes 4.

Figure 4:
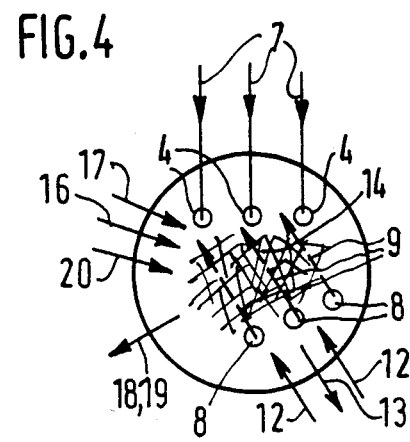
FIG. 4 is a diagrammatic plan view of a second embodiment of the invention.

In the embodiment according to FIG. 4, the hearth electrodes 8 are offset laterally and aligned in a plane forming an angle with the plane of the vault electrodes 4, and the return conductors 9 are oriented parallel to one another in the direction of the vault electrodes 4. In FIG. 4, this lateral offset is shown to the right, but of course it is also possible for such a lateral offset to be to the left, the arrangement then being symmetrical to that illustrated in FIG. 4. In both cases, the scrap is introduced into the zone located between the two planes of the vault electrodes 4 and hearth electrodes 8, but nearer to the hearth electrodes 8.

In this embodiment, as shown in FIG. 4, the melting zone 14 has been shifted to the right. It is, of course, possible to shift the said melting zone 14 to the left in respect of a symmetrical arrangement with the hearth electrodes 8 offset laterally to the left. An offset melting zone 14 can make it easier to carry out the continuous feeding 12 of the scrap 11 which is also offset, as is the smoke discharge 13, as shown in FIG. 4. In all the embodiments of the present invention, the second group of conductors 9 is located as near as possible to the bottom 2 of the metal shaft 1, as already mentioned.

A contribution to localizing the melting zone 14 (FIGS. 2 and 3) is made if the hearth electrodes 8, of which there are, for example, three or more, are arranged offset in front of the vault electrodes 4 and parallel to one another in principle, and these hearth electrodes 8 may or may not be in the same plane with and at right angles to the conductors 9.

As a result of this arrangement of the hearth electrodes 8, nearly horizontal current lines are obtained in the bath 10, this being highly favorable for obtaining an additional magnetic field which helps to deflect the electric arcs 15.

According to a technique well known to those skilled in the art, the vault electrodes 4 are made of graphite in the conventional way.

The vault electrodes 4 are parallel to one another and need not be aligned in the same plane, but, for example, could be arranged in the form of a triangle, as could the hearth electrodes 8.

The length of the vault electrodes 4 (FIG. 1) secured to the tongs 5 is reduced as much as possible by using the conductive arms 6. As an example, the lengths of the vault electrodes 4 can be less than 2 meters for a furnace of the order of 40 MW.

To improve the conditions for localizing the melting zone 14, the feed conductors 7 (FIGS. 1 to 4) are arranged in a direction opposite the melting zone 14 considered to be nearest to the furnace and, in principle, parallel to one another.

Because the shaft does not have to form a magnetic screen, the bottom 2 of the metal shaft 1 is of minimum thickness. It has a low relative magnetic permeability of approximately 40 to approximately 500, and is preferably made of a non-magnetic metallic material.

As regards an arrangement offset laterally between the vault electrodes and the hearth electrodes, as shown in FIG. 4, the scrap feed 12 and the smoke discharge 13 are arranged approximately in the extension of the vault electrodes 4 of the melting zone 14 and the hearth electrodes 8. In this case, the alloying-element intake 16, the oxygen blowing intake 17, the cleaning sill 18, the casting hole 19 and the lime intake 20 are arranged on the side opposite that towards which the melting zone 14 has been offset. To be beneficial to the melting zone 14, it is desirable if an injection of oxygen 21 is made on the surface of the metal by means of a lance located on the same side as the feed and return of the current, i.e., on the side of the vault where the conductors 7 arrive and where the conductors 9 leave.

The present invention thus proposes a furnace of relatively simple design which allows careful use of the magnetic field generated by the electrical conductors, in order to ensure accurate localization of the melting zone in the most suitable place. This results in much higher efficiency than has previously been possible.

The number and arrangement of the conductors could be modified, as required.

We claim:

1. A direct current arc furnace for the continuous melting of scrap, comprising
   (a) a shaft (1) having a bottom (2) forming a hearth (3) having a refractory lining and closed by means of a vault (1'), said shaft (1) containing a bath of liquid metal (10) formed by melting scrap, said shaft having an axis;
   (b) means for continuously feeding said scrap via an orifice (12) in said vault (1'), said orifice (12) being offset on a first side of the axis of said shaft;
   (c) a direct current source (23) having a negative pole and a positive pole;
   (d) at least one vault electrode (4) connected to said negative pole of said direct current source (23) by means of at least one first conductor (7);
   (e) said at least one vault electrode (4) being offset on a second side of the axis of said shaft (1) opposite said first side;
   (f) at least one hearth electrode (8) connected to said positive pole of said direct current source (23) by means of at least one second conductor (9);
   (g) said at least one hearth electrode (8) being offset on said first side of the axis of said shaft (1);
   (h) said at least one second conductor (9) connected to said hearth electrode (8) passing under the bottom (2) of said shaft (1) as near as possible to the latter and being directed towards said second side of the shaft, so as to pass substantially vertically in line with said at least one vault electrode (4);
   (i) said scrap being melted by an arc flashing from said vault electrode (4), said arc being deflected by magnetic fields generated by the circulation of current in said at least one second conductor (9) towards a zone of said shaft (1) set apart from said at least one vault electrodes (4) and located substantially below said scrap feed orifice (12).

2. A direct current arc furnace for the continuous melting of scrap, comprising
   (a) a shaft (1) having a bottom (2) forming a hearth (3) having a refractory lining and closed by means of a vault (1'), said shaft (1) and said vault (1') having an axis, said shaft (1) containing a bath of liquid metal (10) formed by melting scrap;
   (b) means for continuously feeding said scrap via an orifice (12) in said vault (1'), said scrap feed orifice (12) being offset on a first side of the axis of said shaft;
   (c) a direct current source (23) having a negative pole and a positive pole;
   (d) a plurality of vault electrodes (4) arranged in a first series directed substantially in a first vertical plane and respectively connected to said negative pole of said direct current source (23) by means of a first group of conductors (7) parallel to one another and directed transversely to said plane of said vault electrodes;
   (e) said first vertical plane being offset on a second side of the axis of said shaft (1) opposite said first side;
   (f) a plurality of hearth electrodes (8) arranged in a second series directed substantially in a second vertical plane and respectively connected to said positive pole of said direct current source (23) by means of a second group of conductors (9) parallel to one another and directed transversely to said plane of said hearth electrodes.
   (g) said second vertical plane being offset on the same, first side of said shaft (1) as said scrap feed orifice (12);
   (h) said second conductors (9) of said hearth electrodes (8) passing under the bottom (2) of said shaft (1) as near as possible to the latter and being directed towards said second side of the shaft (1) so as to pass substantially vertically in line respectively with said vault electrodes (4);
   (i) said scrap being melted by an arc flashing from said vault electrodes (4), said arc being deflected by magnetic fields generated by the circulation of current in said second conductors (9) towards a zone of said shaft (1) set apart from said vault electrodes (4) and located substantially below said scrap feed orifice (12).

3. An arc furnace according to claim 2, wherein said hearth electrodes (8) are offset laterally and aligned in a second vertical plane forming an angle with said first plane of said vault electrodes (4), and the conductors (9) of said second group are parallel to one another respectively in the direction of said vault electrodes (4).

4. A furnace as claimed in claim 1 or 2, wherein said second conductors (9) are arranged substantially along said bottom (2) of said shaft (1).

5. A furnace as claimed in claim 1 or 2, wherein said hearth electrodes (8) are located in front of the vault electrodes (4), as seen in the direction of said scrap feed orifice (12).

6. A furnace as claimed in claim 2, wherein both said second conductors (9) and said hearth electrodes (8) are respectively parallel to said first conductors (7) and to said vault electrodes (4).

7. A furnace as claimed in claim 1 or 2, wherein said bottom (2) of said shaft (1) is of minimum thickness.

8. A furnace as claimed in claim 1 or 2, wherein said shaft (1) has a relative magnetic permeability substantially in the range of 40 to 500.

9. A furnace as claimed in claim 1 or 2, wherein said shaft (1) is made of non-magnetic metallic material.

10. A furnace as claimed in claim 1 or 2, comprising a reinforcement of refractory material (3') on the same side as the scrap feed orifice (12).

11. A furnace as claimed in claim 10, wherein said refractory material (3') is selected from the group consisting of metallic oxides, cast iron and steel.

12. A furnace as claimed in claim 1 or 2, wherein said shaft (1) is mounted tiltably about a horizontal axis substantially perpendicular to a vertical plane of symmetry, on which at least one group of vault electrodes (4) is centered, a casting hole (19) and a cleaning sill (18) being located on either side of said axis.

13. A furnace as claimed in claim 1 or 2, further comprising an alloying element intake (16) and an oxygen blowing intake (17) located opposite said scrap feed orifice (12).

14. A furnace as claimed in claim 1 or 2, further comprising an oxygen injection (21) on a surface of the metal on the same side as said scrap feed orifice (12) and return of electrical current.

* * * * *